United States Patent
Dai et al.

(10) Patent No.: US 12,417,167 B2
(45) Date of Patent: Sep. 16, 2025

(54) AUTONOMOUS SOFTWARE TESTING ROBOT AIMS AT STORAGE PRODUCT DEFECT DETECTION

(71) Applicant: Dell Products L.P., Round Rock, TX (US)

(72) Inventors: Cherry Dai, Chengdu (CN); Amber Jing Li, Chengdu (CN); En Shi, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 466 days.

(21) Appl. No.: 17/509,230

(22) Filed: Oct. 25, 2021

(65) Prior Publication Data
US 2023/0121576 A1 Apr. 20, 2023

(30) Foreign Application Priority Data
Oct. 19, 2021 (CN) .......................... 202111213435.0

(51) Int. Cl.
G06F 11/3668 (2025.01)
G06F 11/30 (2006.01)
G06F 11/34 (2006.01)
G06F 11/3698 (2025.01)

(52) U.S. Cl.
CPC ........ *G06F 11/3688* (2013.01); *G06F 11/302* (2013.01); *G06F 11/3495* (2013.01); *G06F 11/3698* (2025.01)

(58) Field of Classification Search
None
See application file for complete search history.

(56) References Cited

U.S. PATENT DOCUMENTS

| | | | |
|---|---|---|---|
| 9,047,414 B1* | 6/2015 | Matyjek | G06F 11/3692 |
| 10,949,337 B1* | 3/2021 | Yalla | G06N 20/00 |
| 11,775,878 B2* | 10/2023 | Gao | G06F 11/3688 |
| | | | 706/12 |
| 11,860,769 B1* | 1/2024 | Yun | G06F 11/3664 |
| 2018/0349256 A1* | 12/2018 | Fong | G06F 40/284 |
| 2019/0042979 A1* | 2/2019 | Devulapalli | G06N 3/006 |
| 2020/0409829 A1* | 12/2020 | Bedi | G06F 11/3684 |
| 2021/0064515 A1* | 3/2021 | Xu | G06N 3/08 |
| 2021/0209419 A1* | 7/2021 | Ramnani | G06F 9/5077 |
| 2022/0179635 A1* | 6/2022 | Fang | G06N 3/045 |

(Continued)

OTHER PUBLICATIONS

Du et al., Machine Learning and Software Engineering, Kluwer Academic Publishers, 2003. (Year: 2003).*

(Continued)

*Primary Examiner* — Ryan D. Coyer
(74) *Attorney, Agent, or Firm* — Krishnendu Gupta; Lesley Leonessa

(57) ABSTRACT

Methods, system, and non-transitory processor-readable storage medium for a tuning system are provided herein. An example method includes providing, by a tuning module, a tuning action based on a state associated with a test case, executing, by a tuning agent, the test case using the tuning action, assessing, by a tuning assessment module, the tuning action with respect to a long-term reward, and determining a similarity between a subsequent execution of the test case and the assessment of the tuning action on at least one previous execution of the test case to tune the tuning action.

20 Claims, 6 Drawing Sheets

(56) References Cited

U.S. PATENT DOCUMENTS

2022/0198255 A1\* 6/2022 Sautier .................. G06F 40/30
2022/0237107 A1\* 7/2022 Subbunarayanan ........................
                                                        G06F 9/45504
2022/0343208 A1\* 10/2022 Singh .................... G06N 20/00

OTHER PUBLICATIONS

Fu et al., "Tuning for software analytics: Is it really necessary?" Elsevier, 2016. (Year: 2016).\*
Wan et al., "How does Machine Learning Change Software Development Practices?" IEEE, 2019. (Year: 2019).\*

\* cited by examiner

AUTONOMOUS SOFTWARE TESTING ROBOT AIMS AT STORAGE PRODUCT DEFECT DETECTION

FIELD

The field relates generally to information processing systems, and more particularly to efficiently re-creating defects in such systems.

BACKGROUND

Within the Agile software testing process, the tuning of test case parameters plays a significant role. Agile is an iterative approach to project management and software development. Tuning test parameters involves determining the combinations of test parameters that either trigger failures or have a high possibility of triggering test failures or defects within various test configuration factors (such as, for example, test object scale, workload, duration, etc.). Identifying optimal test parameters increases the probability of triggering valid bugs and defects within information processing systems.

SUMMARY

Illustrative embodiments provide techniques for implementing a tuning system in a storage system. For example, illustrative embodiments comprise a tuning module that provides a tuning action based on a state associated with a test case. A tuning agent executes the test case using the tuning action, and a tuning assessment module assesses the tuning action with respect to a long-term reward. The tuning agent determines a similarity between a subsequent execution of the test case and the assessment of the tuning action on at least one previous execution of the test case to tune the tuning action. Other types of processing devices can be used in other embodiments.

These and other illustrative embodiments include, without limitation, apparatus, systems, methods and processor-readable storage media.

DETAILED DESCRIPTION

Figure 1:
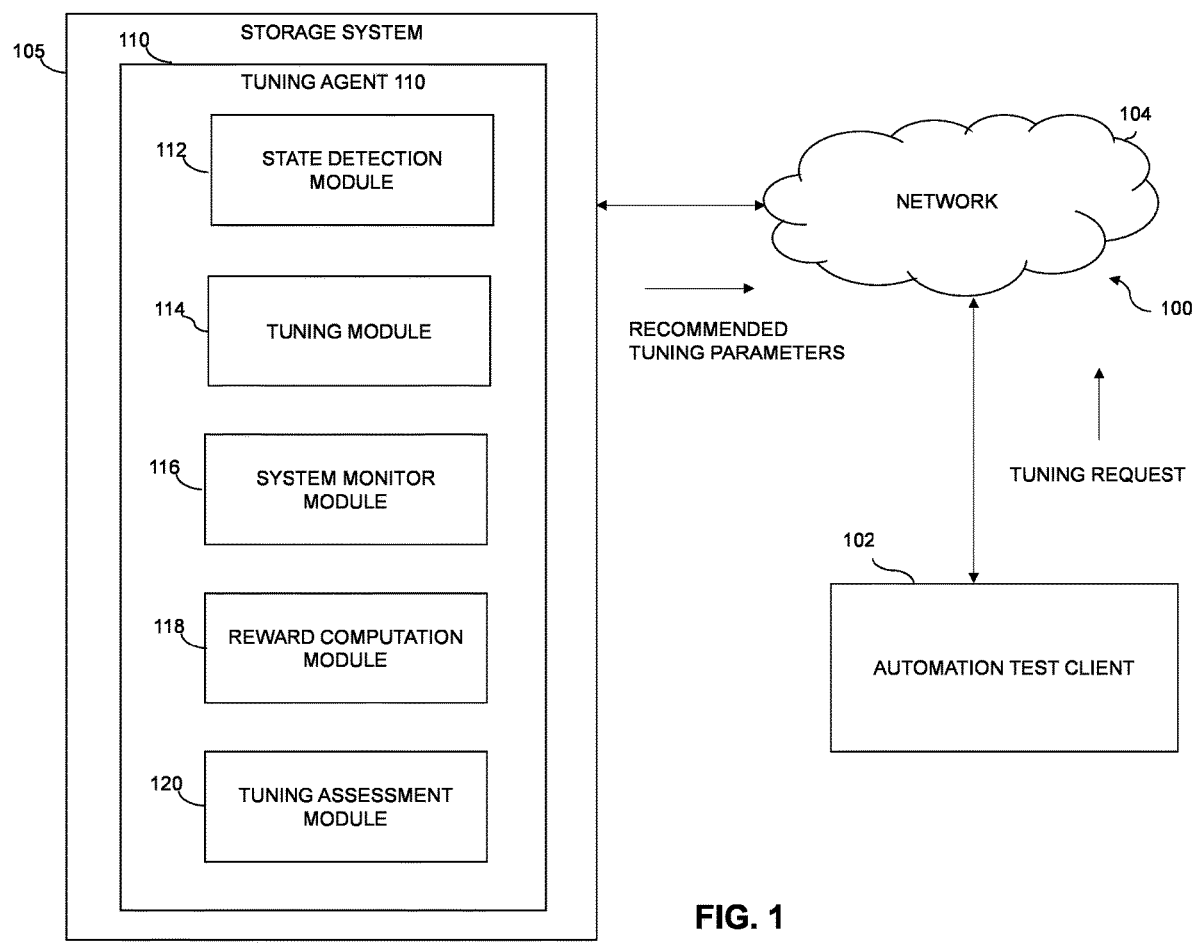
FIG. 1 shows an information processing system comprising a tuning agent and an automation test client in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Described below is a technique for use in implementing a tuning system, which technique may be used to provide, among other things, a tuning module that provides a tuning action based on a state associated with a test case. A tuning agent executes the test case using the tuning action, and a tuning assessment module assesses the tuning action with respect to a long-term reward. The tuning agent determines a similarity between a subsequent execution of the test case and the assessment of the tuning action on at least one previous execution of the test case to tune the tuning action.

Tuning test parameter in a complex information processing system efficiently can be a time consuming and cost intensive task. There can be many combinations of test parameter values to try out, and often not enough time in which to determine the optimal combination of test parameters to optimize the triggering of defects in a complex information processing system.

Conventional approaches to tuning test parameters can be problematic. Typically, testers tune the parameters manually, relying on their tuning experience or performing a deep dive into the source code. Neither of these approaches is efficient. Conventional technologies do not provide a means to share the tuning experience and expertise among testers. Conventional technologies do not provide for tuning test parameters, learning from previous tuning tests and decision making based on tuning tests.

By contrast, in at least some implementations in accordance with the current technique as described herein, in a tuning system, a tuning module provides a tuning action based on a state associated with a test case. A tuning agent executes the test case using the tuning action, and a tuning assessment module assesses the tuning action with respect to a long-term reward. The tuning agent determines a similarity between a subsequent execution of the test case and the assessment of the tuning action on at least one previous execution of the test case to tune the tuning action.

Thus, a goal of the current technique is to provide a method and a system for providing a tuning system. Another goal is to iteratively learn an optimal tuning policy using a trial and error approach, and then adaptively reuse those results for subsequent similar testing efforts. Another goal is to identify the best parameters for testing without exploring numerous combinations of test parameter values. In other words, identifying parameters that have a high possibility of triggering bugs/defects in an information processing system within smaller test configurations and with a limited number of trials, finding bugs/defects as early as possible.

In at least some implementations in accordance with the current technique described herein, the use of a tuning system can provide one or more of the following advantages: providing a tuning system that iteratively tunes, learns, and makes decisions for test parameters to find defects as soon as possible, recommending test parameters that have a higher possibility of triggering defects, reducing labor costs, saving time exploring numerous combinations of test parameters, and not being reliant on human testers experience.

In contrast to conventional technologies, in at least some implementations in accordance with the current technique as described herein, in a tuning system, a tuning module provides a tuning action based on a state associated with a test case. A tuning agent executes the test case using the tuning action, and a tuning assessment module assesses the tuning action with respect to a long-term reward. The tuning agent determines a similarity between a subsequent execution of the test case and the assessment of the tuning action on at least one previous execution of the test case to tune the tuning action. The tuning system is implemented by at least one processing device comprising a processor coupled to a memory.

In an example embodiment of the current technique, the tuning agent receives a tuning request for the test case executing on the automation test client, from an automation test client. A state detection module obtains the state associated with the test case. A system monitor module monitors run time status during execution of the test case. A reward computation module assesses a reward resulting from the tuning action applied to execution of the test case. The tuning agent comprises the state detection module, the tuning module, the system monitoring module, the reward computation module, and the tuning assessment module.

In an example embodiment of the current technique, the state comprises at least one test parameter, a test bed identifier, and a test runtime environment status, at a point in time.

In an example embodiment of the current technique, the test runtime environment status comprises at least one of average total input/output operations per second (IOPS), central processing unit (CPU) utilization, and average physical space usage during the test case execution.

In an example embodiment of the current technique, the tuning agent receives test case information and runtime information associated with the test case, wherein a previous execution of the test case resulted in no errors.

In an example embodiment of the current technique, initial training of the test case is performed by selecting a random state in which to apply the tuning action to the execution of the test case.

In an example embodiment of the current technique, at least one parameter is randomly generated to use when applying the tuning action to the execution of the test case.

In an example embodiment of the current technique, a tuning policy is tailored for the test case by defining at least one of: tuning parameters, a parameter maximum and minimum, a tuning interval, and a state associated with the test case that triggers an ending of the tuning effort.

In an example embodiment of the current technique, a tuning policy is applied to the tuning action to determine modification of at least one test parameter for a subsequent execution of the test case.

In an example embodiment of the current technique, the assessment module assesses the tuning action to maximize the long-term reward.

In an example embodiment of the current technique, the reward computation module determines a ratio between a test result score and a test configuration score.

In an example embodiment of the current technique, the test result score identifies a severity of a failure that occurs during execution of the test case.

In an example embodiment of the current technique, the test configuration score is a weighted sum of configuration factors, wherein the configuration factors comprise at least one of input/output operations per second (IOPS), central processing unit (CPU) utilization, and duration of the test case.

In an example embodiment of the current technique, the tuning assessment module determines an optimal tuning policy to apply to the tuning action when applying the tuning action to the execution of the test case.

In an example embodiment of the current technique, the tuning assessment module determines recommended parameters for execution of the test case to increase probability of detecting errors during execution of the test case.

In an example embodiment of the current technique, a matching degree is calculated between test case details associated with a subsequent execution of the test case and test case details associated with at least one of a plurality of previous executions of the test case, each having a respective tuning action, wherein the test case details comprise test case information, test bed information, and test runtime information.

In an example embodiment of the current technique, at least one of the plurality of previous executions of the test case is determined to have a matching degree higher than a matching degree threshold. The respective tuning action associated with at least one of a plurality of previous executions of the test case is used for the subsequent execution of the test case.

In an example embodiment of the current technique, an average is calculated of at least one of a plurality of previous executions of the test case that are higher than the matching degree threshold.

In an example embodiment of the current technique, at least one of the plurality of previous executions of the test case is determined to not have a matching degree higher than a matching degree threshold. Initial training of the subsequent execution of the test case is performed by selecting a random tuning action based on a probability associated with the state.

FIG. 1 shows a computer network (also referred to herein as an information processing system) 100 configured in accordance with an illustrative embodiment. The computer network 100 comprises an automation test client 102. The automation test client 102 is coupled to a network 104, where the network 104 in this embodiment is assumed to represent a sub-network or other related portion of the larger computer network 100. In an example embodiment, there may be additional automation test clients (not shown) coupled to the network 104. Accordingly, elements 100 and 104 are both referred to herein as examples of "networks," but the latter is assumed to be a component of the former in the context of the FIG. 1 embodiment. Also coupled to network 104 is a storage system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

The storage system 105 comprises a tuning agent 110, which may be described as a self adaptively learning based test case parameters tuning agent. In an example embodiment, the tuning agent 110 may be deployed as a service in the cloud. The tuning agent is comprised of a state detection module 112, a tuning action selection module 114, a system monitor module 116, a reward computation module 118, and a tuning assessment module 120.

The state detection module 112 obtains a state of a test case, such as the current test case. In an example embodiment, the tuning agent 110 receives a tuning request for a test case executing on the automation test client 102. The tuning action selection module 114 observes the current state, s(t), and provides a tuning action, a(t), to the tuning agent 110. In an example embodiment, the current state, s(t), comprises at least one test parameter, a test bed identifier, and a test runtime environment status, at a point in time t.

The system monitor 116, monitors the system under test run time status during each test case execution, for example, data unavailable or data lost (DU/DL), panics, performance degradation, memory leaks, critical error messages in the system log, etc.

The reward computation module 118 calculates the reward of action, a(t), in state, s(t), based on the severity level of bugs/defects, and/or system under test status and/or final configuration in which the bug/defect occurred.

The tuning assessment module 120 uses a reinforcement learning algorithm to calculate the tuning assessment based on the state s(t), action a(t), reward, and next state (t+1). The tuning assessment Q(s,a) is a mapping between the states and actions that maximizes a long term reward. In other words, Q(s, a) is the value of taking action a in state t.

The automation test client 102 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The automation test client 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the storage system 105 are one or more input-output devices, which illustratively comprise keyboards, displays or other types of input-output devices in any combination. Such input-output devices can be used, for example, to support one or more user interfaces to the storage system 105, as well as to support communication between storage system 105 and other related systems and devices not explicitly shown. For example, a user may invoke a test case on the automation test client 102. One or more input-output devices may also be associated with any of the automation test client 102.

Additionally, the storage system 105 in the FIG. 1 embodiment is assumed to be implemented using at least one processing device. Each such processing device generally comprises at least one processor and an associated memory, and implements one or more functional modules for controlling certain features of the storage system 105.

More particularly, the storage system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the storage system 105 to communicate over the network 104 with the automation test client 102, and illustratively comprises one or more conventional transceivers.

A tuning system may be implemented at least in part in the form of software that is stored in memory and executed by a processor, and may reside in any of storage system 105 and/or automation test client 102. The tuning system may be a standalone plugin that may be included within a processing device. That processing device may be any of storage system 105, automation test client 102, or any other processing device. The tuning system may reside on processing devices separate from storage system 105 and/or automation test client 102. In this example scenario, any of storage system 105 and automation test client 102 may send and receive messages to the separate processing devices to access the methods of the tuning system.

It is to be understood that the particular set of elements shown in FIG. 1 for storage system 105 involving automation test client 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the storage system 105 can be on and/or part of the same processing platform.

An exemplary process of an example tuning system using storage system 105 and automation test client 102 in computer network 100 will be described in more detail with reference to, for example, the flow diagrams of FIG. 2, FIG. 3, and FIG. 4.

Figure 2:
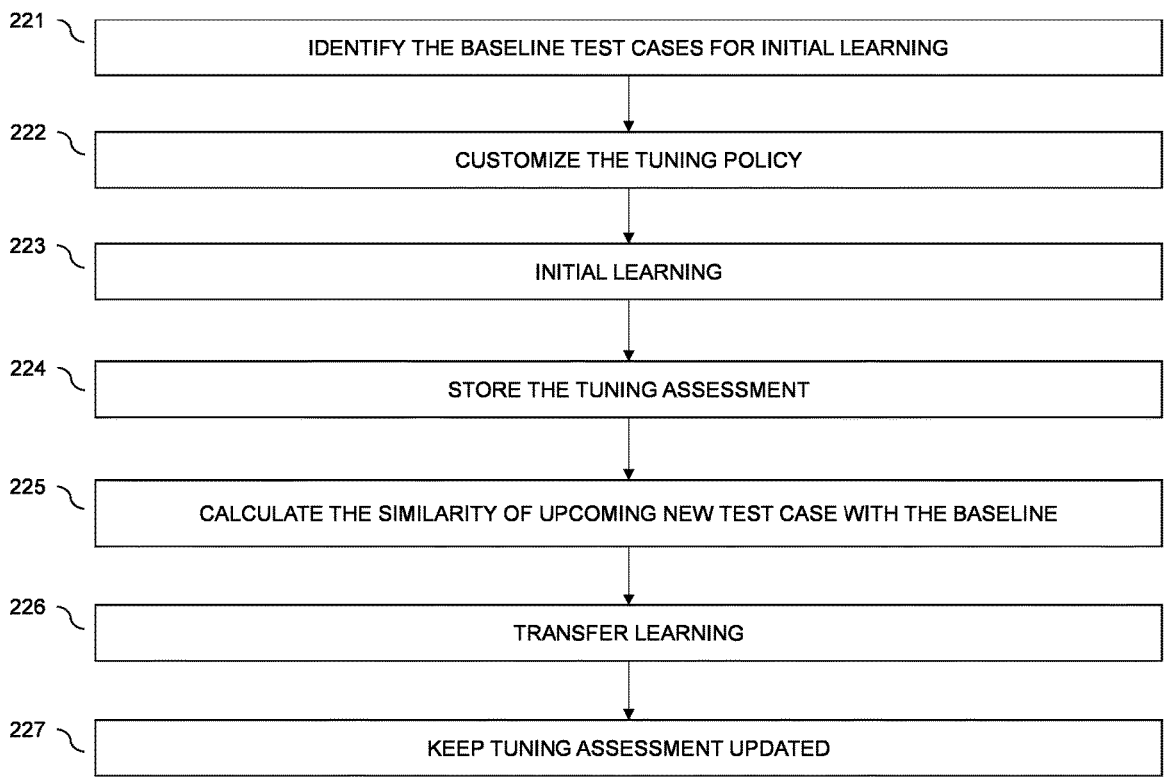
FIG. 2 shows a high level flow diagram of a process for a tuning system in an illustrative embodiment.

Referring now to FIG. 2, this figure shows a high level flow diagram of a process for a tuning system in an illustrative embodiment. It is to be understood that this particular process is only an example, and additional or alternative processes can be carried out in other embodiments.

At 221, the baseline test cases for initial learning are identified. In an example embodiment, test cases may be selected for a specific test area.

At 222, the tuning policy is customized. For example, the parameters for tuning may be customized, such as defining the state space, highest values, lowest values, the tuning interval, and the states that end the tuning. An example of these values is listed below:

| parameters | state space | increase/decrease | tuning action |
| --- | --- | --- | --- |
| p1 | [50, 500] | increase or decrease by 25 | In the current state increase or decrease p1 to obtain the parameter for the subsequent state |
| p2 | [1, 40] | increase by ¼ | Multiply p2 by 1.25 to obtain the parameter for the subsequent state |
| p3 | [60, 45, 30, 15] | decrease by 15 | Decrease p3 in the current state in order to obtain the parameter for the subsequent state |

At 223, the intial learning is performed. The purpose of the initial learning is to gain experience that may be used to make transfer training faster to achieve the goal of identifying the best parameters for testing without exploring numerous combinations of test parameter values. In other words, identifying parameters that have a high possibility of triggering bugs/defects in an information processing system within smaller test configurations and with a limited number of trials. In an example embodiment, the configuration may be calculated by multiple factors, such as test object scale, workload, duration, etc.

In an example embodiment, this training may be performed within an episodic framework. In each episode, the tuning agent 110 begins at a random state, and performs a fixed number of training steps as shown in FIG. 3. For example, the tuning agent 110 generates random parameter combinations parameters$_t$ at time t. The tuning agent 110 executions the test case with parameters$_t$ to obtain the current stat $S_t$={parameters$_t$, test_bed, runtime_info$_t$}.

At 224, the tuning agent 110 stores the tuning assessment including Q(s, a), which is the value of taking action a in state t, and the test report for the failed test cases. The test report may include the test case information, test parameters that triggered a failure, test bed information and test runtime environment status. A test case report that includes failures information is listed below:

<Test Case information>
 Test case Name: <Test Case Name>
 Test area: <Test Area ID>
 Test Keyword: <Keyword1, keyword2, . . . , KeywordN>
<Test Parameters Trigger Failure>
 Parameter1=200
 parameter2=4
 parameter3=45
<Test Bed Information>
 Hardware: <Hardware>
 Platform: <Platform>
<Test Runtime Information>:
 average_total_IOPS=60K
 average_CPU_Util=70%
 average physical_space_usage=40%

At 225, a similarity is calculated between a new tuning request and the generated test failure report as explained above. The similarity is calculated based on the test case information, test bed information and test runtime information. In an example embodiment, a matching degree threshold may be configured. In this example scenario, a generated test failure report that has a matching degree that is higher than the matching degree threshold may be considered to be a "reusable experience", meaning the tuning actions (for example, specific combinations of test parameters) may be applied to the new tuning request.

At 226, the tuning agent 110 tunes the parameters during the transfer learning step according to the generated test failure report and the calculated similarity. The tuning agent 110 returns recommended test parameter combinations which have been determined to have a high probability of triggering bugs/defects.

At 227, the tuning agent 110 continues to update the tuning assessment.

Figure 3:
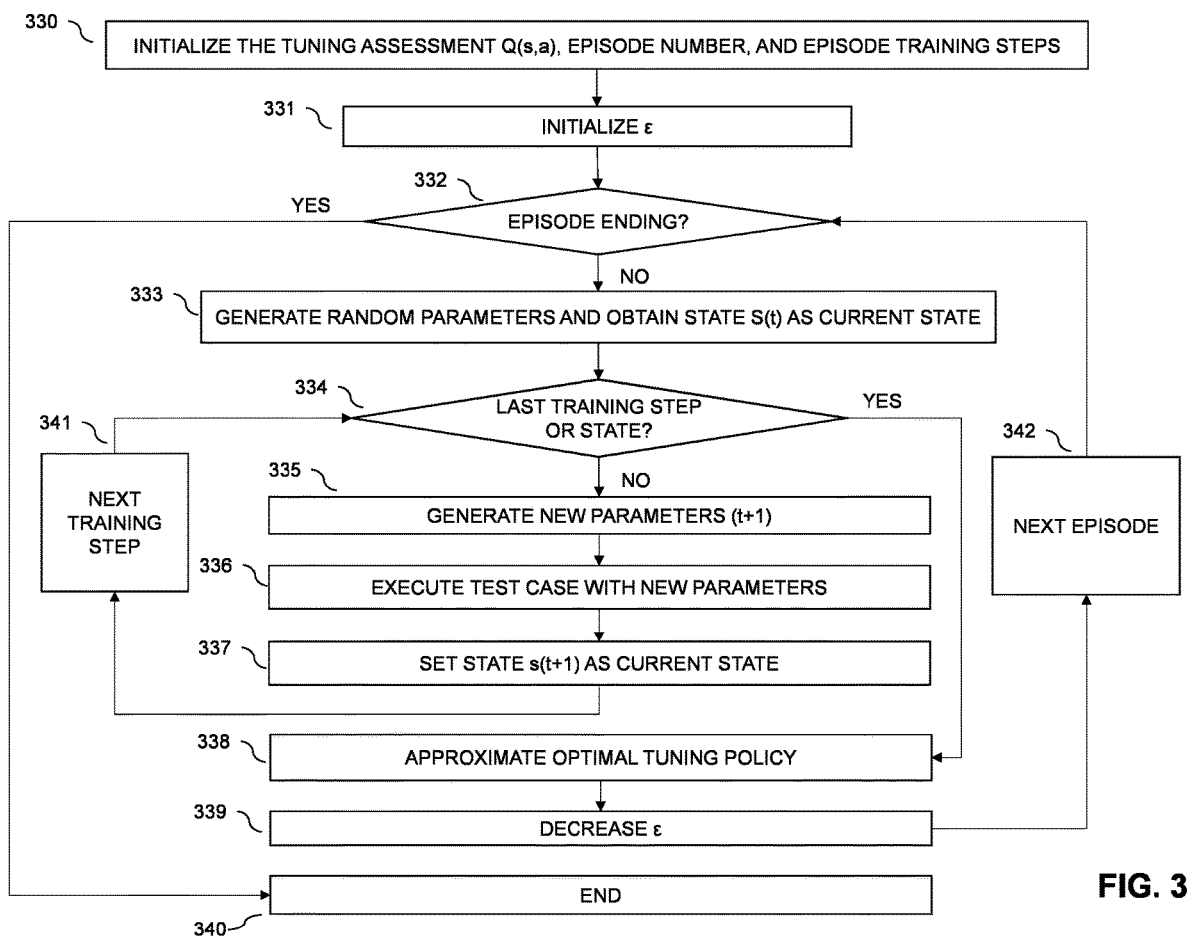
FIG. 3 shows a flow diagram of a process for an episodic framework used in a tuning system in an illustrative embodiment.

FIG. 3 is a flow diagram of a process for an episodic framework used in a tuning system in an illustrative embodiment. FIG. 3 describes in more detail the episode framework described at 223 in FIG. 2. It is to be understood that this particular process is only an example, and additional or alternative processes can be carried out in other embodiments.

At 330, the tuning agent initializes the running assessment Q(s,a) with episode number, and episode training steps. For example, the tuning agent 110 generates random parameter combinations parameters$_t$ at time t. The tuning agent 110 executions the test case with parameters$_t$ to obtain the current stat $S_t$={parameters$_t$, test_bed, runtime_info$_t$}.

At 331, the tuning agent 110 initializes ε.

At 332, the tuning agent 110 determines if the episode is ending. If yes, the tuning assessment process ends. If no, at 333, the tuning agent 110 generates random parameters and obtains state s(t) as the current state.

At 334, the tuning agent 110 determines if the episodic framework has reached the last training step or state. If no, at 335, the tuning agent 110 generates new parameters parameters$_{t+1}$. In an example embodiment, the tuning agent may select random tuning actions based on the probability of ε. In another example embodiment, the tuning agent 110 selects the best tuning actions that have already been observed. In other words, those tuning actions with the highest Q(s,a). The tuning agent 110 then generates the new parameters parameters$_{t+1}$.

At 336, the tuning agent 110 executes the test case using the new parameters parameters$_t$-Fi and assesses the reward Rt (Rt=test result score/test configuration score), and determines the next state $S_{t+1}$={parameters$_{t+1}$, test_bed$_t$, runtime_info$_{t+1}$}.

At 337, the tuning agent 110 sets state $S_{t+1}$ as the current state. At 341, the tuning agent 110 repeats the 334 through 337 until the last training step or state is reached.

At 334, when the last training step or state has been reached, the tuning agent 110, at 338 approximates the optimal tuning policy. In an example embodiment, the tuning agent 110 uses reinforcement learning and ($s_t$, $a_t$, Rt, $s_{t+1}$) to update Q(s,a) in order to approximate the optimal policy. There are multiple RL algorithms that may be used to extrapolate the optimal policy. The RL algorithms may include, but not limited to, Q-learning, Deep Q Networks (DQN) algorithm, Double Deep Q Networks (DDQN) algorithm.

At 339, the tuning agent 110 gradually decreases c, and at 342, the process advances to the next episode within the episodic framework.

Figure 4:
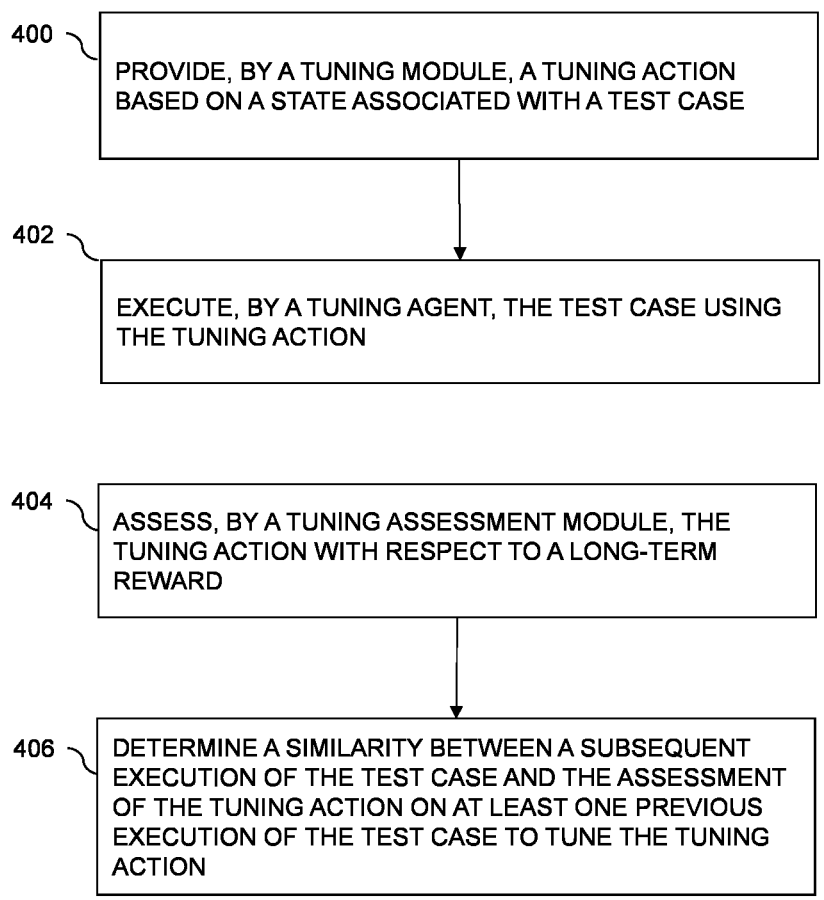
FIG. 4 shows a flow diagram of a process for a tuning system in an illustrative embodiment.

FIG. 4 shows a flow diagram of a process for a tuning system in an illustrative embodiment. It is to be understood that this particular process is only an example, and additional or alternative processes can be carried out in other embodiments.

In an example embodiment, the tuning agent 110 receives from an automation test client 102, a tuning request for the test case executing on the automation test client 102. The tuning agent 110 comprises the state detection module 112, the tuning module 114, the system monitor module 116, the reward computation module 118, and the tuning assessment module 120.

In an example embodiment, the tuning agent 110 may receive test case information and test bed information. In an example embodiment, the tuning agent 110 may receive the tuning request for a test case that executed without generating any bugs/defects. In this example scenario, the tuning agent 110 receives test case information and runtime information associated with the test case.

In an example embodiment, a state detection module 112 obtains the state associated with the test case. The state detection module 112 obtains the state of the current test case which includes parameters associated with the tuning request.

In an example embodiment, the state comprises at least one test parameter, a test bed identifier, and a test runtime environment status, at a point in time. In an example embodiment, state space may be defined as $S=\{S_1, S_2, \ldots S_n\}$ where each $S_t=\{parameters_t, test\_bed, runtime\_info_t\}$. In an example embodiment, $parameters_t$ represents a combination of test parameters, and test_bed is a static value that represents test bed information which may include, but is not limited to, hardware or platform information. In an example embodiment, test runtime environment status comprises at least one of average total IOPS, average CPU utilization, and average physical space usage during the test case execution. In an example embodiment, the $runtime\_info_t$ value represents test runtime environment status which may include, but is not limited to, the rounding value of average total IOPS, average CPU utilization, and average physical space usage during the execution of the test case. An example of $S_t$ may be:

<Parameters>
  Parameter1=200
  parameter2=4
  parameter3=45
<test_bed>
  Hardware:<hardware>
  Platform: <platform>
<runtime_info>
  average_total_IOPS=60(K)
  average_CPU_Util=70 (percentage)
  average_physical_space_usage=40(percentage)

In an example embodiment, the system monitor module 116 monitors run time status during execution of the test case. The system monitor module 116 monitors the system under test run time status during each test case execution, for example, data unavailable or data lost (DU/DL), panics, performance degradation, memory leaks, critical error messages in the system log, etc.

At 400, a tuning module 114 provides a tuning action based on a state associated with a test case. In an example embodiment, the tuning agent 110 performs performing initial training of the test case by selecting a random state in which to apply the tuning action to the execution of the test case as explained in FIG. 2. In an example embodiment, the tuning agent 110 generates at least one parameter randomly to use when applying the tuning action to the execution of the test case as explained in FIG. 3.

In an example embodiment, the tuning agent 110 tailors the tuning policy for the test case by defining at least one of tuning parameters, a parameter maximum and minimum, a tuning interval, and a state associated with the test case that triggers an ending of the tuning effort as explained at 222 in FIG. 2. In an example embodiment, the tuning agent 110 applies a tuning policy to the tuning action to determine modification of at least one test parameter for a subsequent execution of the test case, again as explained at 222 in FIG. 2.

At 402, the tuning agent 110 executes the test case using the tuning action.

At 404, the tuning assessment module 120 assesses the tuning action with respect to a long-term reward. In an example embodiment, tuning the test parameters for the test case to efficiently determine the optimal test parameters may be determined using reinforcement learning where rewards are received for actions performed correctly, and penalties are received for action performed incorrectly. In an example embodiment, the tuning agent 110 observes the state of the environment $S_t$ at time t, selects an action $a_t$, and receives a reward Rt.

In an example embodiment, the tuning agent 110 determines an optimal tuning policy to apply to the tuning action when applying the tuning action to the execution of the test case The objective is to determine an optimal tuning policy $\pi^*$ that maximizes the long term reward.

In an example embodiment, in a given state s, there may be two tuning actions, where a1 indicates increasing a first parameter and a2 indicates decreasing the first parameter. In an example embodiment, when test cases are executed (separately) using tuning action a1 and tuning action a2, the test results maybe that neither tuning action results in triggering a bug or defect, meaning that the immediate reward of either tuning action a1 and/or tuning action a2 is negative. However, in this example embodiment, the long term value of tuning action a1, which is represented as Q(s, a1) may be determined to be greater than the long term value of action tuning action a2, which is represented as Q(s, a2).

To find the optimal tuning policy, an action-value function $Q_\pi(s,a)$ defines the value of taking action a in state s under policy $\pi$. In an example embodiment, there are multiple ways to extrapolate the optimal policy $\pi$. The reinforcement learning algorithms may include, but are not limited to, Q-learning, Deep Q Networks (DQN) algorithm, and Double Deep Q Networks (DDQN) algorithm. In the reinforcement learning framework, the reward Rt signal indicates what is good in an immediate sense, whereas a value function $Q_\pi(s, a)$ estimates 'how good' of the action a in given state s in the long term. Thus, in an example embodiment, a goal of the tuning agent 110 is to maximize the long-term value instead of the immediate reward.

In an example embodiment, the reward computation module 118 assesses a reward resulting from the tuning action applied to execution of the test case. In an example embodiment, the reward computation module 118 assesses the tuning action to maximize the long-term reward. In an example embodiment, a reward function R may be defined to guide the tuning agent 110 towards tuning actions that increase the probability of quickly and efficiently triggering bugs/defects when the test case is executed. Thus, the objective of the tuning agent 110 is to find critical bugs withing fewer trials and iterations with smaller final configurations. Another objective is to maximize the likelihood of triggering those critical bugs.

In an example embodiment, the reward is determined using a ratio between a test result score and a test configuration score, for example:

$Rt$=test result score/test configuration score

In an example embodiment, the test result score identifies a severity of a failure that occurs during execution of the test case. An example of a test result score that is based on the severity level of bugs/defects or system under test status is listed below:

| Test Status | Test Result Score |
|---|---|
| Failed with critical bugs | 10 |
| Failed with bugs | 8 |
| Passed with performance degradation | 6 |
| Passed with error message(s) found in the system logs | 5 |
| Passed without any error or performance degradation | −5 |

In an example embodiment, the test configuration score is a weighted sum of configuration factors, where the configuration factors comprise at least one of IOPS, CPU utilization, and duration of the test case. In an example embodiment, the test configuration score is based on the final configuration in which the bug/defect occurs. For example:

test_configuration_score=$W1$*scale_score+
$W2$*IOPS_score+$W3$*CPU_utilization_score+
$W4$*duration_score, where $\Sigma_{i=1}^{N} Wi$ (Wi indicates the weight of the configuration factor i).

In an example embodiment, weight is defined by its importance, and may be predefined by the customers. The sum of the weights equal one.

In an example embodiment, the tuning assessment module 120 determines recommended parameters for execution of the test case to increase probability of detecting errors during execution of the test case. In an example embodiment, there may be multiple test parameter, for example, but not limited to, workload (for example, of the automation test client 102), duration of the test case, data pattern (which is included within the workload), scale (meaning the number of testing objects, for example, in a storage system, the number of storage resource objects, such as volumes, LUNs, File Systems, etc.), etc.

Depending on different factors, such as the test area or test feature, some combinations may be more likely to trigger bugs/defects than others. In an example embodiment, the tuning agent 110 begins tuning the tuning action using initial parameter combinations, where each tuning action modifies a single parameter value.

In an example embodiment, the tuning agent 110 observes the current state s(t) and provides an tuning action a(t) to the environment. At every time step t, each tuning action is modifing a single input value(for example, increasing or decreasing a parameter) based on the tuning policy in order to get the next state. Below is an example where a test case has 3 parameters and the tuning policy is customized as listed in the tuning action column:

| parameters | state space | increase/decrease | tuning action |
|---|---|---|---|
| p1 | [50, 500] | increase or decrease by 25 | In the current state increase or decrease p1 to obtain the parameter for the subsequent state |
| p2 | [1, 40] | increase by ¼ | Multiply p2 by 1.25 to obtain the parameter for the subsequent state |
| p3 | [60, 45, 30, 15] | decrease by 15 | decrease p3 in the current state in order to obtain the parameter for the subsequent state |

In an example embodiment, for current parameters$_t$={p1, p2, p3}, the tuning actions are as listed below:

| actions | parameter modification | new parameters |
|---|---|---|
| 1 | No action | {p1, p2, p3} |
| 2 | p1 <− p1 + 25 | {p1 + 25, P2, p3} |
| 3 | p1 <− p1 − 25 | {p1 − 25, p2, p3} |
| 4 | p2 <− P2 * (1 + ¼) | {p1, p2 * (1 + ¼), p3} |
| 5 | p3 <− p3 − 15 | {p1, p2, p3 − 15} |

In an example embodiment, for tuning action 1, there are no modifications to the test parameters. For tuning action 2, the tuning agent 110 will execute the test case in step (t+1), with new parameters {p1+25, P2, p3}, and obtain new runtime information. The next state is then $S_{t+1}$={parameters$_t$+i, test_bed$_t$, runtime_info$_{t+1}$} where the parameters$_t$+i represents one of the new parameters, test_bed is a static value represents test bed information. runtime_info$_{t+1}$ represents test runtime environment status at step t+1.

At 406, the tuning agent 110 determines a similarity between a subsequent execution of the test case and the assessment of the tuning action on at least one previous execution of the test case to tune the tuning action. In an example embodiment, the similarity of a new tuning request is calculated with respect to the test case report that was generated as described at 224 in FIG. 2. The similarity is calculated based on the test case information, test bed information, and test runtime information.

In an example embodiment, the tuning agent 110 calculates a matching degree between test case details associated with a subsequent execution of the test case and test case details associated with at least one of a plurality of previous executions of the test case, where each of the previous executions have their respective tuning action. In an example embodiment, the test case details comprise test case information, test bed information, and test runtime information. In other words, the matching degree is used to calculate the similarity of the new tuning requests for a test case executing on the automation test client 102 with previously executed test cases.

In an example embodiment, the tuning agent 110 determines that at least one of the plurality of previous executions of the test case has a matching degree higher than a matching degree threshold.

In an example embodiment, a matching degree threshold can be configured. In an example embodiment, the tuning agent 110 uses the respective tuning action associated with at least one of a plurality of previous executions of the test case for the subsequent execution of the test case. In an example embodiment, all the historical failure information with a matching degree that is higher than the matching degree threshold may be considered to be a "reusable" tuning action. In other words, if the test case associated with the new tuning request has a matching degree that is higher than the matching degree threshold, the tuning actions associated with a previously executed test case may be used.

In an example embodiment, if there are multiple test reports for a specific tuning request each with a matching degree higher than the matching degree threshold, the tuning agent 110 calculates an average of at least one of a plurality of previous executions of the test case that are higher than the matching degree threshold. For example, if there are N test failure reports:

Test Failure Report 1, 2, 3, . . . N

| test case information | test bed information | test runtime information |
| --- | --- | --- |

The matching degree threshold (MDT) is 7. There is one tuning request with the following matched record:

| Matched record | matching degree (MD) | Recommended Parameters combinations (PC) |
| --- | --- | --- |
| Test failure report 1 | 9 | <P1 = 5 , P2 = 5, P3 = 24> |
| Test failure report 2 | 8 | <P1 = 100, P2 = 7, P3 = 12> |
| Test failure report 3 | 6 | <P1 = 70, P2 = 2, P3 = 56> |
| Test Area | | <Test Area ID> |
| Average matching degree | | 8.5 |

In this example embodiment, there are 2 test failure reports with a matching degree higher than the matching degree threshold. Thus, the average matching degree is calculated as (9+8)/2=8.5.

In an example embodiment, the parameters associated with test failure reports with a matching degree higher than the matching degree threshold will be treated as the initial value of the transfer tuning as explained at 226 in FIG. 2. In the example explained above, there are 2 recommended parameter combinations (where parameters$_i$=PC$_i$):

$$PC_1: <P1=50, P2=5, P3=24> \text{with } MD_1=9$$

$$PC_2: <P1=100, P2=7, P3=12> \text{with } MD_2=8$$

In an example embodiment, parameters is set based on the average matching degree. In an example embodiment, if the new tuning request is more similar to a previous tuning request in the initial learning, the tuning agent 110 leverages the previous experience. The c parameter may also be referred to as the exploration and exploitation trade-off parameter. Based on the current state, with probability ε, select a random action with probability (1−ε) indicating the tuning action with the highest Q(s,a) that has been observed thus far. The parameter ε is calculated (This is also described at 331 and 339 in FIG. 3.):

$$\varepsilon_i = \{1, MD_i \geq MDT(\text{Not able to leverage the previous experience(s). Need to explore } \varepsilon)$$

$$\varepsilon_i = \{1/MD_i > MDT(\text{Higher similarity. May be able to leverage a previous experience})$$

In an example embodiment, the tuning agent 110 will use the recommended parameter combinations, as described above, as the initial parameters instead of generating random parameter combinations as described at 333 in FIG. 3.

In an example embodiment, the tuning agent 110 determines that at least one of the plurality of previous executions of the test case does not have a matching degree higher than a matching degree threshold. In this example scenario, the tuning agent 110 performs an initial training of the subsequent execution of the test case by selecting a random tuning action based on a probability associated with the state.

Accordingly, the particular processing operations and other functionality described in conjunction with the flow diagram of FIG. 2, FIG. 3, and FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve tuning test parameters to trigger defects. For example, some embodiments are configured to provide at least one of: iteratively learning an optimal tuning policy using a trial and error approach, and then adaptively reusing those results for subsequent similar testing efforts, identifying the best parameters for testing without exploring numerous combinations of test parameter values, identifying parameters that have a high possibility of triggering bugs/defects in an information processing system within smaller test configurations and with a limited number of trials, and finding bugs/defects as early as possible. These and other embodiments can effectively improve how data is protected relative to conventional approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
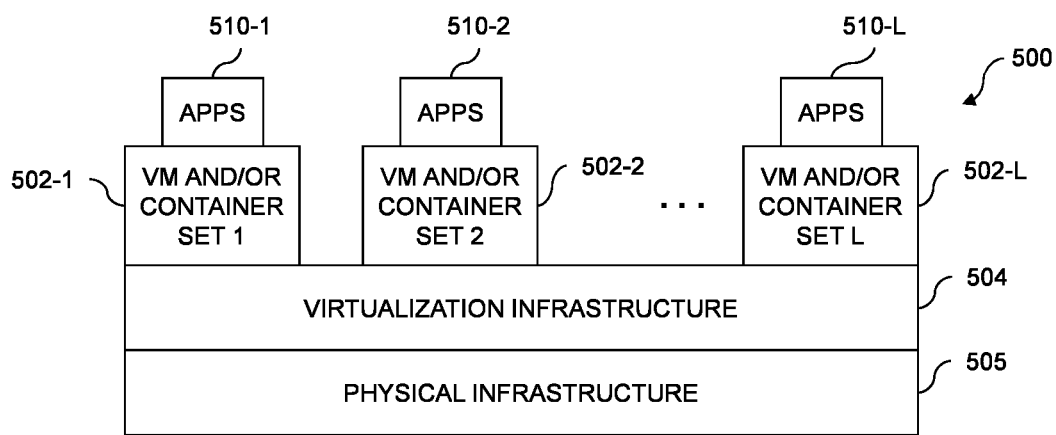
FIGS. 5 and 6 show examples of processing platforms that may be utilized to implement at least a portion of a distributed and multi-level server authentication embodiments.
Figure 6:
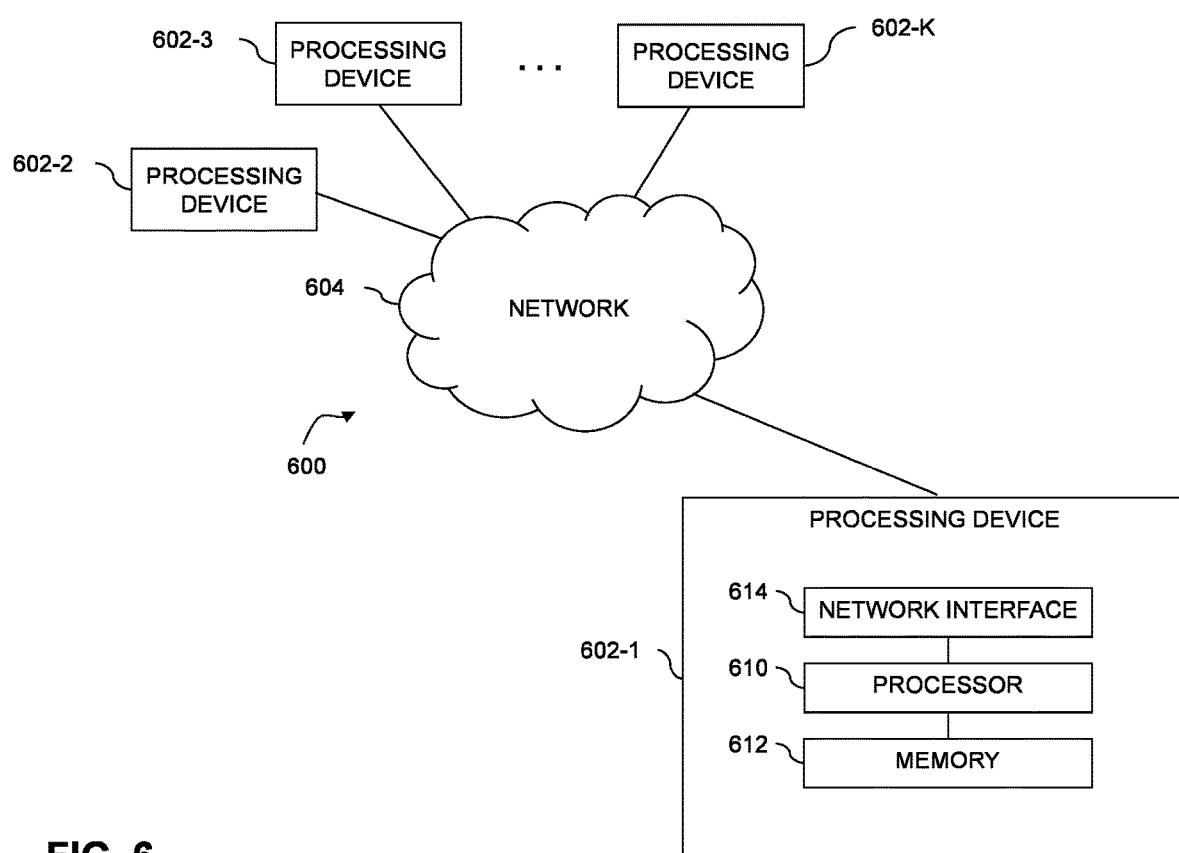

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, where the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 4 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an application-specific integrated circuit (ASIC), a field-programmable gate array (FPGA) or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
providing, by a tuning module, a tuning action based on a state associated with a test case;
executing, by a tuning agent, the test case using the tuning action;
assessing, by a tuning assessment module, the tuning action with respect to a long-term reward, wherein the reward is determined using a ratio between a test result and a test configuration score, wherein the test configuration score is a weighted sum of configuration factors comprising input/output operations per second (IOPS), average Central Processing Unit (CPU) utilization, and duration of the test case; and
determining a similarity between a subsequent execution of the test case and the assessment of the tuning action on at least one previous execution of the test case to tune the tuning action, wherein the method is implemented by at least one processing device comprising a processor coupled to a memory.

2. The method of claim 1 further comprising:
receiving, by a tuning agent from an automation test client, a tuning request for the test case executing on the automation test client;
obtaining, by a state detection module, the state associated with the test case;
monitoring, by a system monitor module, run time status during execution of the test case; and
assessing, by a reward computation module, a reward resulting from the tuning action applied to execution of the test case;
wherein the tuning agent comprises the state detection module, the tuning module, the system monitoring module, the reward computation module, and the tuning assessment module.

3. The method of claim 2 wherein the state comprises at least one test parameter, a test bed identifier, and a test runtime environment status, at a point in time.

4. The method of claim 3 wherein the test runtime environment status comprises at least one of average total input/output operations per second (IOPS), average Central Processing Unit (CPU utilization), and average physical space usage during the test case execution.

5. The method of claim 1 wherein providing, by the tuning module, the tuning action comprises:
performing initial training of the test case by selecting a random state in which to apply the tuning action to the execution of the test case.

6. The method of claim 5 further comprising:
generating at least one parameter randomly to use when applying the tuning action to the execution of the test case.

7. The method of claim 1 wherein providing, by the tuning module, the tuning action comprises:
tailoring a tuning policy for the test case by defining at least one of:
i) tuning parameters;
ii) a parameter maximum and minimum;
iii) a tuning interval; and
iv) a state associated with the test case that triggers an ending of the tuning effort.

8. The method of claim 1 wherein providing, by the tuning module, the tuning action comprises:
applying a tuning policy to the tuning action to determine modification of at least one test parameter for a subsequent execution of the test case.

9. The method of claim 2 wherein assessing, by an assessment module, the tuning action with respect to a long-term reward comprises:
assessing the tuning action to maximize the long-term reward.

10. The method of claim 2 wherein assessing, by the reward computation module, the reward comprises:
determining the ratio between the test result score and the test configuration score.

11. The method of claim 10 wherein the test result score identifies a severity of a failure that occurs during execution of the test case.

12. The method of claim 10 wherein the test configuration score is based on a final configuration in which a bug or defect occurs.

13. The method of claim 2 wherein assessing, by the tuning assessment module, the tuning action with respect to the long-term reward comprises:
determining an optimal tuning policy to apply to the tuning action when applying the tuning action to the execution of the test case.

14. The method of claim 2 wherein assessing, by the tuning assessment module, the tuning action with respect to the long-term reward comprises:
determining recommended parameters for execution of the test case to increase probability of detecting errors during execution of the test case.

15. The method of claim 1 further comprising:
calculating a matching degree between test case details associated with a subsequent execution of the test case and test case details associated with at least one of a plurality of previous executions of the test case, each having a respective tuning action, wherein the test case details comprise test case information, test bed information, and test runtime information.

16. The method of claim 15 further comprising:
determining that the at least one of the plurality of previous executions of the test case has a matching degree higher than a matching degree threshold; and
using the respective tuning action associated with the at least one of a plurality of previous executions of the test case for the subsequent execution of the test case.

17. The method of claim 15 further comprising:
calculating an average of the at least one of a plurality of previous executions of the test case that are higher than the matching degree threshold.

18. The method of claim 15 further comprising:
determining that the at least one of the plurality of previous executions of the test case does not have a matching degree higher than a matching degree threshold; and
performing initial training of the subsequent execution of the test case by selecting a random tuning action based on a probability associated with the state.

19. A system comprising:
at least one processing device comprising a processor coupled to a memory;
the at least one processing device being configured:
  to provide, by a tuning module, a tuning action based on a state associated with a test case;
  to execute, by a tuning agent, the test case using the tuning action;
  to assess, by a tuning assessment module, the tuning action with respect to a long-term reward, wherein the reward is determined using a ratio between a test result and a test configuration score, wherein the test configuration score is a weighted sum of configuration factors comprising input/output operations per second (IOPS), average Central Processing Unit (CPU) utilization, and duration of the test case; and
  to determine a similarity between a subsequent execution of the test case and the assessment of the tuning action on at least one previous execution of the test case to tune the tuning action.

20. A computer program product comprising a non-transitory processor-readable storage medium having stored therein program code of one or more software programs, wherein the program code when executed by at least one processing device causes said at least one processing device:
  to provide, by a tuning module, a tuning action based on a state associated with a test case;
  to execute, by a tuning agent, the test case using the tuning action;
  to assess, by a tuning assessment module, the tuning action with respect to a long-term reward, wherein the reward is determined using a ratio between a test result and a test configuration score, wherein the test configuration score is a weighted sum of configuration factors comprising input/output operations per second (IOPS), average Central Processing Unit (CPU) utilization, and duration of the test case; and
  to determine a similarity between a subsequent execution of the test case and the assessment of the tuning action on at least one previous execution of the test case to tune the tuning action.

* * * * *